(No Model.)

T. C. SMITH.
WATER FILTER.

No. 341,068. Patented May 4, 1886.

Witnesses

Joseph B. Lyman.
Jos. S. Michael

Inventor

UNITED STATES PATENT OFFICE.

THOMAS C. SMITH, OF BROOKLYN, NEW YORK.

WATER-FILTER.

SPECIFICATION forming part of Letters Patent No. 341,068, dated May 4, 1886.

Application filed January 22, 1886. Serial No. 189,377. (No model.)

*To all whom it may concern:*

Be it known that I, THOMAS C. SMITH, a citizen of the United States, and a resident of Greenpoint, in the city of Brooklyn, county of Kings and State of New York, have invented a new and useful Improvement in Water-Filters, of which the following is a specification.

The purpose of this invention is to provide a water-filter that may be packed in small compass for the use of travelers, and one that can be set up and adjusted for operation at a moment's notice, thus insuring a supply of wholesome drinking-water.
The drawings accompanying this specification represent vertical central sections made in accordance with my invention.

Figure 1:
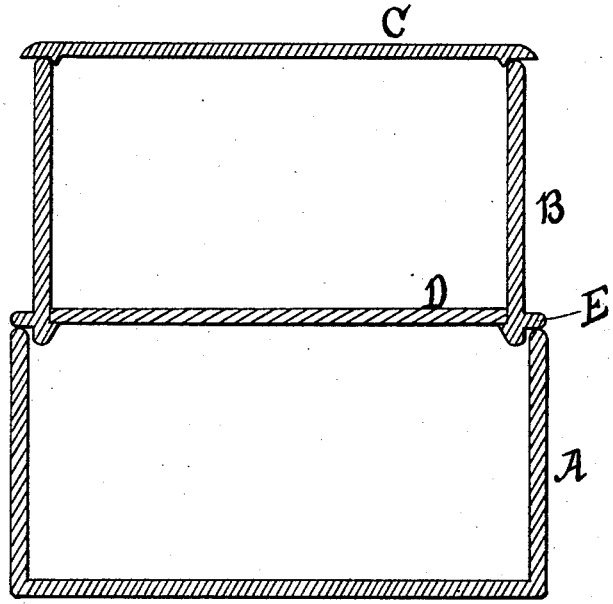
Figure 2:
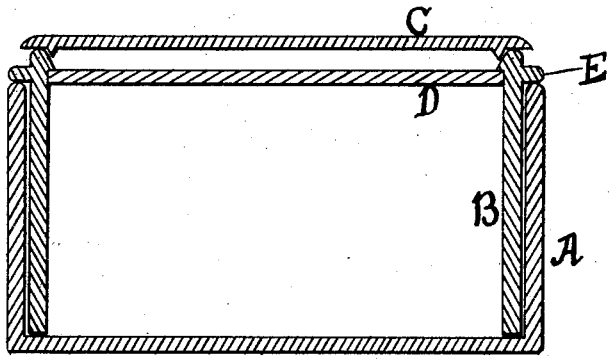

Figure 1 shows the filter set up ready for use; Fig. 2, the filter stowed for packing in trunk or bag.

Similar letters of reference indicate like parts.

A is the receptacle for the filtered water, and support for the vessel B when in operation.
B is the vessel to hold the impure water to be filtered, having at E an external projecting flange which rests upon the wall of A.

C is the cover of the filtering-vessel B.

D is a filtering-disk of any suitable material.
When taken down to stow the vessel B is reversed and nested into the vessel A, and the cover C used as a protection to the filtering-disk D, all as shown in Fig. 2.

My invention is applicable to filters of any size or form or made of any suitable material. Porcelain or vitrified stoneware is preferable to other materials.

Having thus described my invention, I claim as new and desire to secure by Letters Patent—

1. A filter consisting of a vessel provided with a filtering medium and a supporting flange at the lower part thereof, and a receptacle forming a support to said vessel when in use, the upper part of said vessel being of different diameter from the said receptacle, so that when reversed the two will nest together, substantially as described.

2. A filter consisting of the vessel for holding the liquid to be filtered, the receptacle for the filtered liquid, and the cover, the said vessel being provided with a filtering medium and a supporting flange at the bottom, and having its upper part of different diameter from said receptacle, so that the two will nest together, the said receptacle supporting the said vessel when in use, and the said cover fitting on either end of the said vessel, substantially as described.

In testimony that I claim the foregoing as my invention I have signed my name, in presence of two witnesses, this 21st day of January, 1886.

THOS. C. SMITH.

Witnesses:
JOSEPH B. LYMAN,
JOS. S. MICHAEL.